United States Patent [19]

Daniels

[11] Patent Number: 4,976,384
[45] Date of Patent: Dec. 11, 1990

[54] SPARE TIRE STORAGE APPARATUS
[75] Inventor: Lonnie E. Daniels, LaGrange, Tex.
[73] Assignees: Steven J. Terrell; Joe Terrell, Weimar, Tex.
[21] Appl. No.: 344,104
[22] Filed: Apr. 25, 1989
[51] Int. Cl.$^5$ .............................................. B62D 43/00
[52] U.S. Cl. .............................. 224/42.23; 224/42.21; 414/466
[58] Field of Search ............... 224/42.21, 42.23, 42.28, 224/42.29, 42.3, 42.41; 414/465, 466

[56] References Cited
U.S. PATENT DOCUMENTS
3,369,683  2/1968  Richards ........................ 224/42.21

FOREIGN PATENT DOCUMENTS
1047762  10/1983  U.S.S.R. ........................ 224/42.41

Primary Examiner—Linda J. Sholl

[57] ABSTRACT

A spare tire storage apparatus which pivots about a pivot point near the bumper of a vehicle and simultaneously pivots up or down between ground level and frame level on the vehicle. Vertical pivoting is accomplished by a cam roller following a cam surface as horizontal pivoting occurs. The spare tire is latched in the storage position by having a roller roll up a pivotable ramp, passing the ramp pivot point, causing the ramp to pivot upwardly, trapping the roller.

8 Claims, 4 Drawing Sheets

SPARE TIRE STORAGE APPARATUS

FIELD OF THE INVENTION

This invention is in the field of devices used to store a spare tire on a motor vehicle. In particular, this invention is best suited for storage of a spare tire on a truck.

BACKGROUND OF THE INVENTION

Most pickup trucks currently in use carry with them a spare tire and wheel mounted underneath the bed of the truck, generally near or against the underside of the truck frame. Most commonly, the spare tire is mounted horizontally in this location and held in place by a simple straight bracket which runs underneath the spare tire. The spare tire is mounted to this bracket by some method such as bolting. The bracket is in turn bolted to the truck bed or frame.

Typically, the bracket is hinged from the frame at one end and bolted to the frame at the other end. The spare is removed from the truck by crawling under the truck and holding the spare and the bracket up while unbolting the bolted end of the bracket. This allows the bracket to be swung down to the ground, giving access to the bolts which secure the spare tire and wheel to the bracket. After the spare tire is unbolted from the bracket, it is manually dragged from under the truck.

This process has many disadvantages. Crawling under the truck and holding the spare tire up while unbolting the bracket will almost always result in soiled hands and clothing. It also may be physically impossible for an aged or handicapped person or a person lacking considerable physical strength, because the spare tire, wheel, and bracket can be very heavy. This process can also result in physical injury, because the spare tire is usually unwieldy, and if it drops unexpectedly, it will usually drop on the person trying to remove it from the vehicle. Finally, since removal from the truck is so troublesome, the spare tire will rarely have its air pressure checked, and it is often flat when most needed.

Several attempts have been made to devise a spare tire storage apparatus which makes the spare tire more easily accessible. Many of these still require crawling underneath the truck to release the tire or its carrier from the frame, or to manually pull the tire from underneath the truck. Some such devices require that the rear bumper of the truck or a portion of the rear bumper swing out of the way to allow the tire to pivot or slide from underneath the truck without being lowered.

Still others attempt to lower the tire first, such as by turning a bolt to screw the tire bracket downward or by turning a rack and pinion gear set to lower the tire. Then, the tire is usually swung out from under the vehicle manually. Regardless of the device, all known past attempts to solve the problems discussed here have resulted in devices which require some considerable strength and manual dexterity or which require significant modifications to the truck.

SUMMARY OF THE INVENTION

This invention is a tire storage apparatus which will both lower the spare tire to the ground at a controlled rate and swing the tire out from under the vehicle in one movement without any necessity for the user to go under the vehicle and without any necessity for the user to support the weight of the tire. A tire carriage rack is supported from the vehicle frame by a vertical pivot pin about which the tire can pivot out from under the vehicle and vice versa. Simultaneously, the rack is supported by a horizontal pivot pin about which the rack can pivot from frame level to ground level and vice versa.

One end of the carriage rack is attached to an operating lever which the user can swing outwardly to bring the spare tire out from under the vehicle and down to ground level. Near the same end of the carriage rack is a cam follower wheel or roller which is positioned to follow a lifting cam surface attached to the frame of the vehicle. As the spare tire is swung outwardly, the roller rolls upwardly along the underside of the lifting cam, allowing the carriage rack to lower to the ground. Similarly, as the carriage rack is pivoted under the vehicle, the roller rolls downwardly among the lifting cam, forcing the carriage rack to rise to the vehicle frame. While moving in either direction, the weight of the tire is supported by the cam.

A latching roller is attached to the other end of the carriage rack and aligned with a pivoted latching ramp attached to the vehicle frame. As the spare tire is pivoted to its storage position under the frame by pushing in on the operating lever, the latching roller rolls upwardly along the latching ramp, assisting in raising the tire to frame level. As the latching roller passes the pivot point of the latching ramp, the ramp pivots so that the latching roller rests behind the ramp pivot point, holding the carriage rack in a latched position. As the carriage rack is swung out from under the vehicle, the user must exert sufficient force on the operating handle to cause the latching roller to roll back past the ramp pivot point. This causes the ramp to pivot back down, and the latching roller rolls back down the ramp.

The operating lever can be locked in its stored position. The operating lever can also be replaced by an electric motor which drives the carriage rack to pivot about the vertical pivot pin.

DETAILED DESCRIPTION OF THE INVENTION

Figure 1:
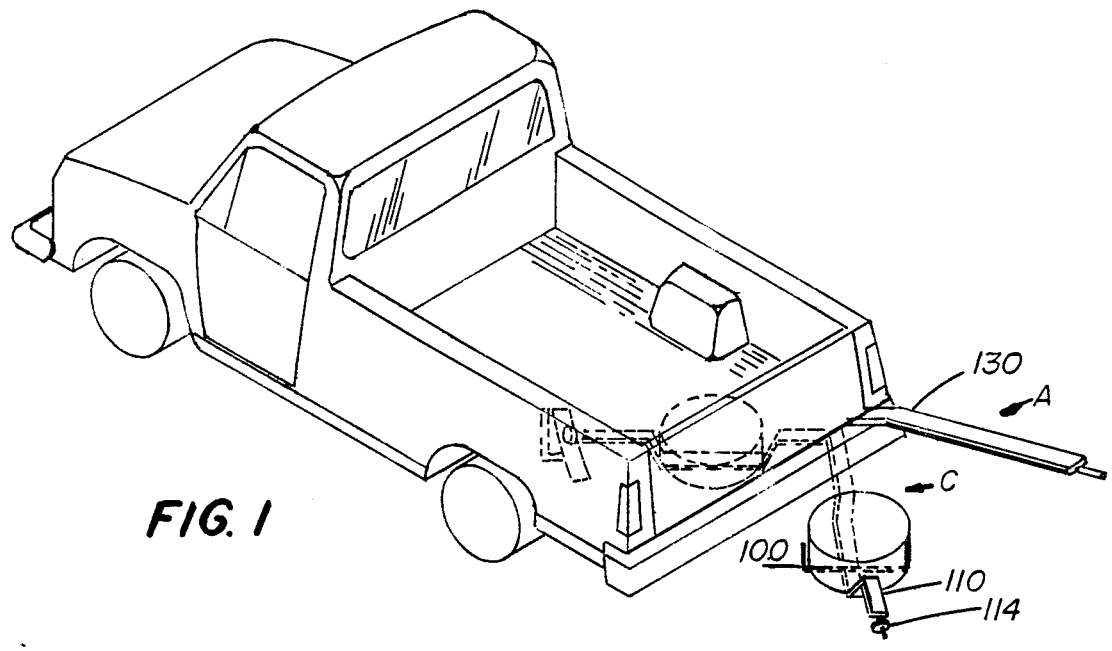
FIG. 1 is a perspective view of the apparatus of the present invention as installed on a typical pickup truck, showing the access position in solid lines and the storage position in dotted lines.
Figure 2:
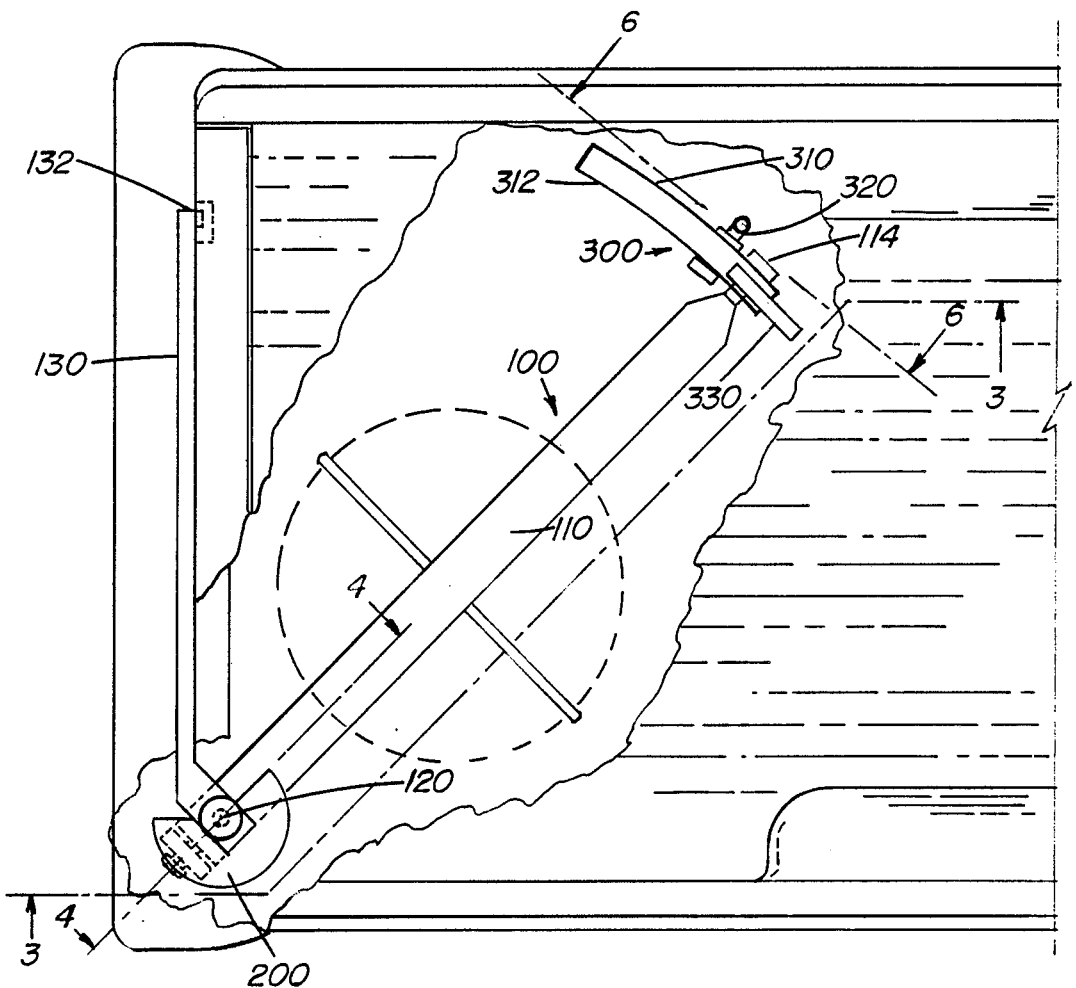
FIG. 2 is a plan view of the apparatus of FIG. 1 in the storage position.
Figure 3:
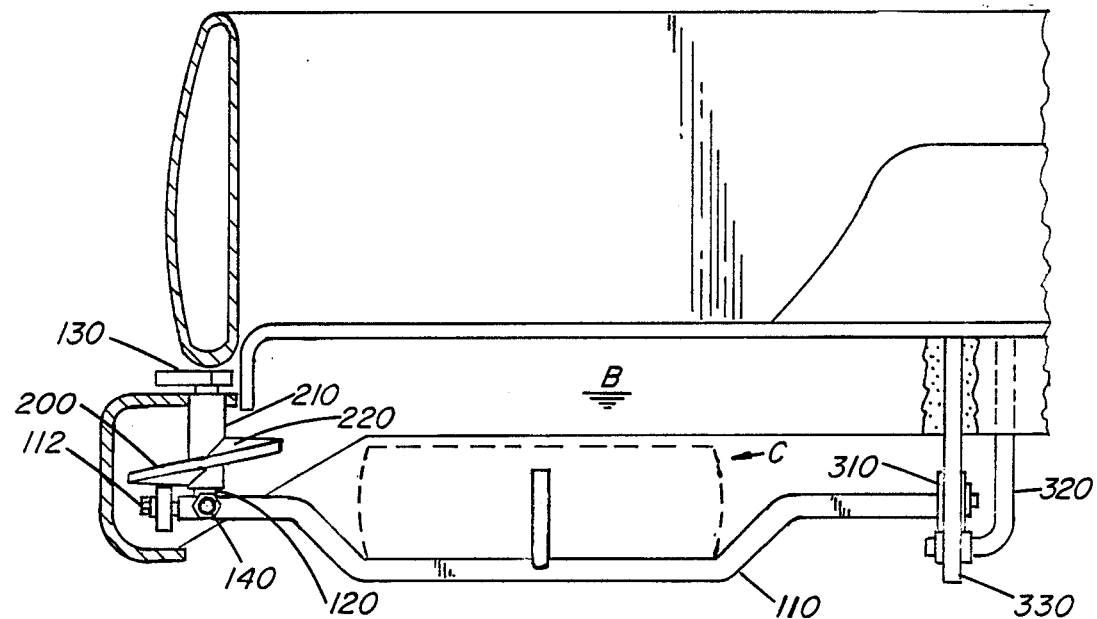
FIG. 3 is an elevational view of the apparatus of FIG. 1 in the storage position.

As seen in FIGS. 1, 2, and 3, tire storage apparatus A is mounted to vehicle frame B so as to pivot under frame B to a storage position or out from under frame B to an access position. Tire C is mounted horizontally on carriage rack 100 of assembly A by being bolted to carriage arm 110.

Carriage arm 110 is attached near one end to the lower end of support post 120 by means of axle 140. Operating lever 130 is mounted near one end to the upper end of support post 120 at such an angle that when carriage arm 110 is in the storage position, operating lever 130 is in its storage position lying along the bumper of the vehicle.

Figure 4:
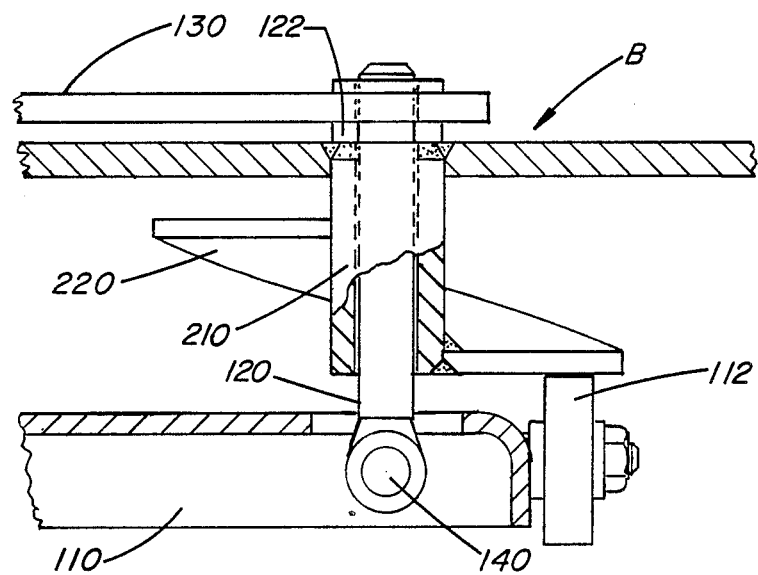
FIG. 4 is a detail section view of the pivot points and the lifting cam of the present invention.

Support post 120 is pivotably mounted to frame B by being rotatably mounted in support tube 210 which is rigidly mounted to frame B, such as by welding. Support post 120 is vertically supported in support tube 210 by thrust washer 122 near its upper end, as shown in FIG. 4. Carriage arm 110 is free to pivot in a horizontal plane with support post 120.

Rigidly attached to the lower end of support post 120 is horizontal pivot axle 140 which extends rotatably through holes in carriage arm 110. Carriage arm is constrained to pivot in a vertical plane about horizontal pivot axle 140.

Support tube 210 is a component of lifting cam 200 which serves to control the vertical position of the spare tire as the apparatus is pivoted between its storage position and its access position. Rigidly mounted to the exterior of support tube 210 is cam surface 220. Cam surface 220 is sloped so as to rise in a counterclockwise direction around support tube 210, when viewed from the top.

Cam roller 112 is rotatably installed on the end of carriage arm 110 on the opposite side of support post 120 from the tire itself. Cam roller 112 is aligned with cam surface 220 so as to bear upwardly against the lower surface of cam surface 220 to support the weight of the tire and carriage arm 110, with axle 140 being the fulcrum. The same result could be obtained by locating cam roller 112 and cam surface 220 on the same side of support post 120 as the tire, with cam roller 112 bearing downwardly against the upper surface of cam surface 220 and cam surface 220 sloped so as to rise in a clockwise direction around support tube 210.

Figure 5:
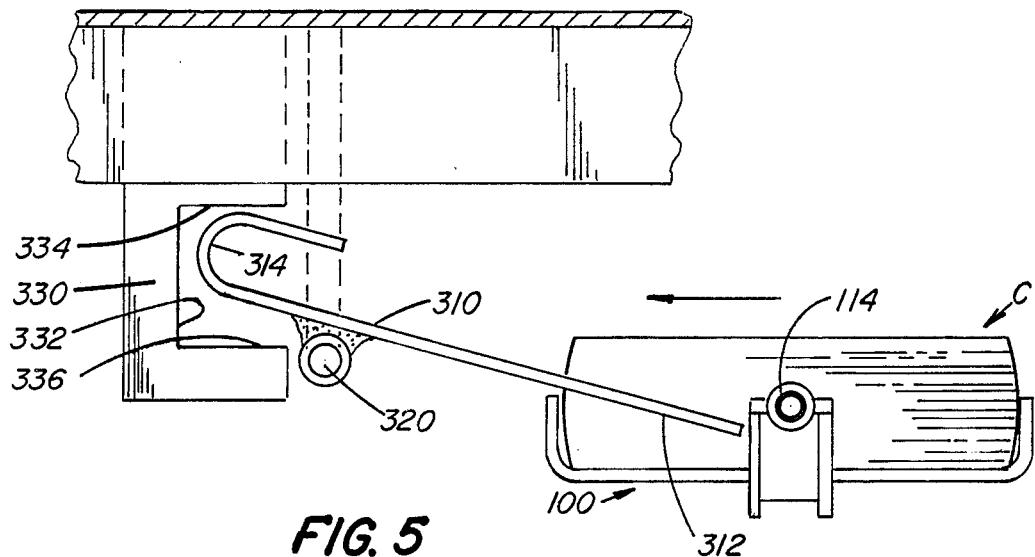
FIG. 5 is a detail view of the latching ramp of the present invention in the lifting position.

Inboard latch 300 is rigidly mounted to frame B on the opposite side of the vehicle from lifting cam 200. Latching ramp 310 is pivotably mounted on pivot bracket 320 which is rigidly mounted to frame B. As seen in FIG. 5, when carriage rack 100 is not in the storage position, ramp 310 is automatically pivoted downwardly under its own weight because of the greater amount of weight being toward the free end 312 of the ramp 310, with free end 312 being sufficiently low to allow latching roller 114 to roll up on the ramp 310, as will be explained. Ramp 310 is stopped at its proper lowered position by having ramp stop end 314 contact stop surface 334 in ramp cutout 332 of ramp stop frame 330 or other suitable stop means mounted on vehicle frame B. Ramp 310 is preferably bent upwardly at stop end 314 to retain latching roller 114 as will be explained.

Figure 6:
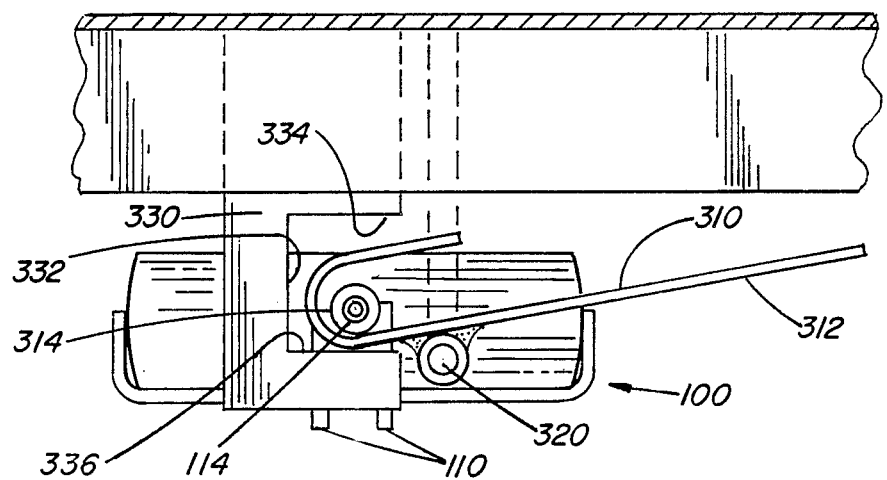
FIG. 6 is a detail view of the apparatus of FIG. 5 in the latched position.

As seen in FIG. 6, when carriage rack 100 is in the storage position, ramp 310 is pivoted upwardly with stop end 314 contacting lower stop surface 336 in ramp cutout 332 of ramp stop frame 330. Latching roller 114 is retained by the aforementioned bend in ramp stop end 314. Latching roller 114 is rotatably mounted on the end of carriage arm 110 opposite the end where cam roller 112 is mounted.

In the operation of the device of the present invention, starting with spare tire C mounted on carriage arm 110 and carriage rack 100 in the access position, shown in solid lines in FIG. 1, the user grasps operating lever 130 near its outer free end. The user pushes operating lever 130 to its storage position, as shown in dotted lines in FIG. 1, aligned with the vehicle bumper.

As operating lever 130 pivots in a clockwise direction, as viewed in FIG. 2, carriage arm 110 also pivots in a clockwise direction, pivoting about support post 120. This causes cam roller 112 to be moved downwardly as it follows the lower side of cam surface 220. Since the roller 112 is on the opposite side of the pivot pin 140 from the major portion of the carriage arm 110, the downward movement of the roller 112 results in a pivoting of the carriage arm 110 about horizontal pivot pin 140, thus swinging the carriage arm 110 upwardly at the same time as it is being pivoted about the vertical pivot pin 120. Therefore, as carriage arm 110 pivots underneath frame B, it also rises toward frame B, all the while maintaining the attitude of the tire rack and spare tire in a perfectly horizontal and level position.

When carriage arm 110 h part of the way underneath the vehicle, latching roller 114 contacts the upper surface of ramp 310 near free end 312 which is in the lowered position (FIG. 5). Latching roller 114 then rolls upwardly along ramp 310, preferably assisting in the raising of spare tire C toward frame B. When latching roller 114 passes the pivot point of ramp 310 at pivot bracket 320, the free end 312 of ramp 310 pivots upwardly until the stop end 314 contacts lower stop surface 336. Latching of the apparatus in this storage position is accomplished by the fact that latching roller 114 will have to roll upwardly along ramp 310 toward pivot bracket 320 if carriage rack 100 is to move in the unlatch direction. Once the tire is in the latched position (FIGS. 2 and 6), the weight of the tire retains it in such latched position, unless a releasing force is applied to the carriage arm 110 by moving the operating lever 130.

The free end of lever 130 is also preferably latched to the vehicle in the storage position. This can be accomplished by having an ear 132 on lever 130 extend downwardly into a notch in the vehicle bumper. Slight upward deflection of the outer end of lever 130 would be required to free ear 132 from the notch. Alternatively, latching of lever 130 could be by means of a lockable latch similar to a common automobile door latch or any other known locking device.

In order to swing the spare tire to the access position shown in solid lines in FIG. 1, the user pulls outwardly on the outer end of lever 130, rotating carriage arm 110 in the counterclockwise direction, as seen in FIG. 2. This will pull latching roller 114 past the pivot pin 320 of ramp 310, causing free end 312 to pivot downwardly until stop end 314 contacts upper stop surface 334. Latching roller 114 then continues to roll down ramp 310, preferably assisting in the lowering of the spare tire. As carriage arm 110 pivots counterclockwise, cam roller 112 rolls along the lower surface of cam surface 220, controlling the descent of the tire to the ground. During such descent, the carriage arm 110 pivots about vertical pin 120 and simultaneously also about horizontal pivot pin 140 all the while maintaining the attitude of the tire rack and spare tire in a perfectly horizontal and level position, so that in effect the movement of the carriage arm 110 corresponds to the incline of the inclined cam surface 220.

Figure 7:
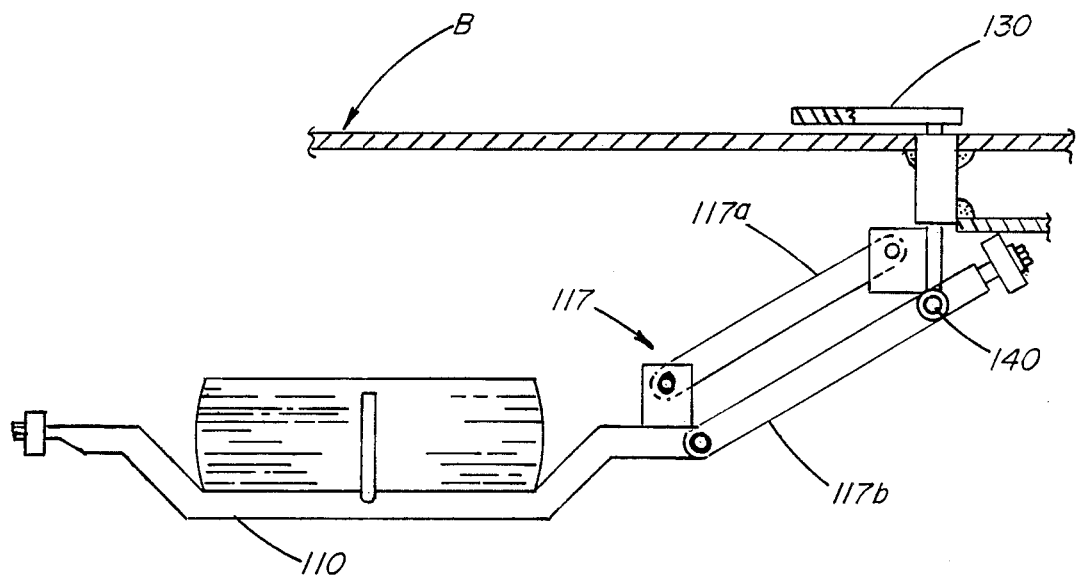
FIG. 7 is an elevational view of the present invention with self-levelling capability in the lowered position.
Figure 8:
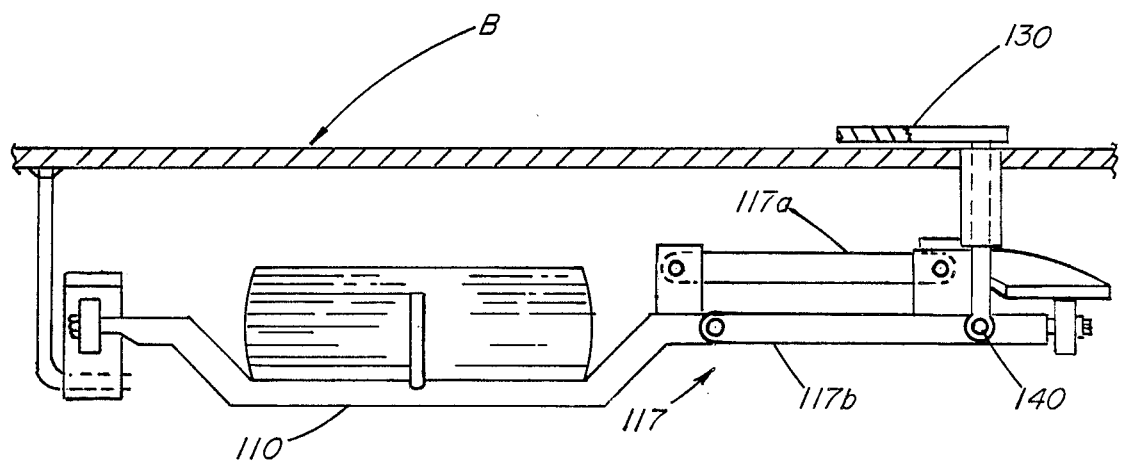
FIG. 8 is an elevational view of the apparatus of FIG. 7 in the raised position.

This embodiment of the invention is shown with carriage arm 110 simply pivoting about axle 140 in a vertical plane. This results in carriage arm 110 having an increasingly steep angle as it pivots toward the access position. The preferred embodiment of the invention is to fit carriage arm 110 with a four-bar linkage 117, as shown in FIGS. 7 and 8, adjacent to axle 140, in order that the attitude of the tire rack and spare will be maintained at all times in a perfectly horizontal and level position; thereby allowing the spare tire to clear the obstruction of the rear bumper installed on most all pickup trucks.

This would result in carriage arm 110 being maintained horizontal by link 117a at all times as link 117b is raised and lowered. Similarly, instead of an operating lever as shown, an electric motor can be mounted to the vehicle frame to drive, via a belt or gears, support post 120.

This embodiment is shown for purposes of illustrating the invention. One skilled in the art can devise variations on this embodiment without departing from the invention. It is intended that all such variations be included in the following claims.

I claim:

1. A spare tire storage apparatus for use on a motor vehicle, comprising:
    a substantially vertical first pivot member attached to the frame of the vehicle;
    a substantially horizontal second pivot member attached to said first pivot member;
    a carriage rack pivotably attached near a first end thereof to said first and second pivot members so as to pivot in a horizontal plane about said first pivot member and simultaneously pivot in a vertical plane about said second pivot member;
    operating means for causing said carriage rack to pivot about said first pivot member;
    a cam surface attached to the vehicle near said carriage rack; and
    cam roller means attached to said carriage rack so as to follow along said cam surface and thereby cause said carriage rack to pivot about said second pivot member as said carriage rack is pivoted by said operating means about said first pivot member.

2. The spare tire storage apparatus of claim 1, wherein said cam surface comprises a flat surface sloping at an oblique angle from horizontal.

3. The spare tire storage apparatus of claim 1, wherein:
    said cam roller means follows along said cam surface in the same angular direction in which said carriage rack pivots in said horizontal plane; and
    said cam surface faces upwardly.

4. The spare tire storage apparatus of claim 1, wherein:
    said cam roller means follows along said cam surface in an opposite angular direction from the angular direction in which said carriage rack pivots in said horizontal plane; and
    said cam surface faces downwardly.

5. The spare tire storage apparatus of claim 1, wherein said first pivot member comprises:
    a tubular member attached to the frame of the vehicle; and
    a longitudinal pivot pin coaxially positioned in said tubular member.

6. The spare tire storage apparatus of claim 1, wherein said second pivot member comprises a pivot pin rigidly attached horizontally to said first pivot member, said pivot pin extending through a hole in said carriage rack.

7. The spare tire storage apparatus of claim 1, wherein said operating means comprises a longitudinal lever attached at a first end thereof to said first pivot member at an angle from said carriage rack so that when said carriage rack is in a storage position, said lever is in a position close to the vehicle.

8. The spare tire storage apparatus of claim 7, further comprising a lock means on said lever for locking said lever in said position close to the vehicle.

* * * * *